(No Model.)
A. BERGHAUS.
Handle Attachment for Agricultural and Like Implements.
No. 235,408. Patented Dec. 14, 1880.
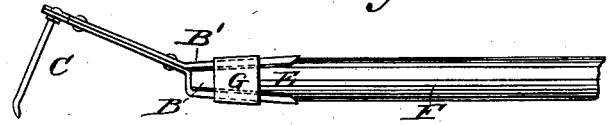
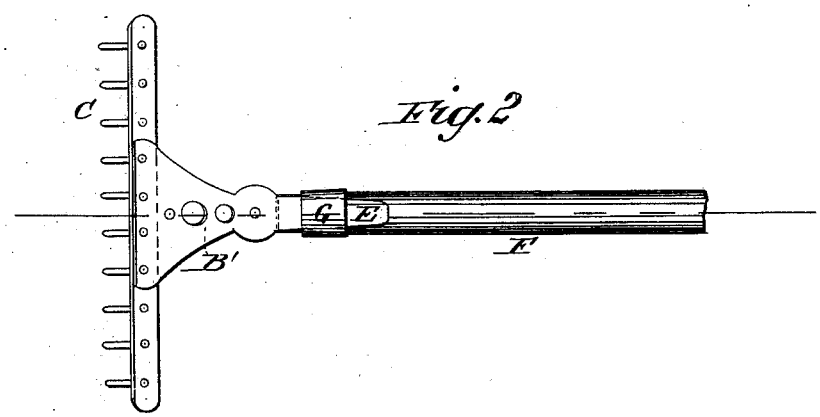
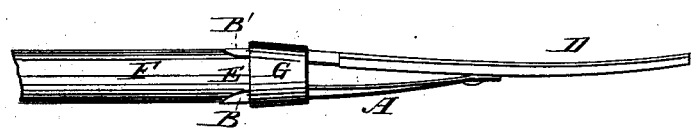
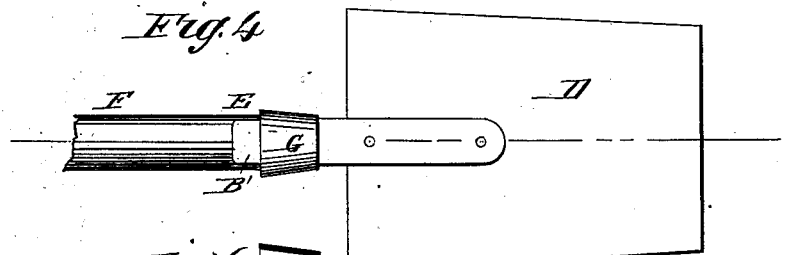
WITNESSES:
INVENTOR:
A. Berghaus
BY
ATTORNEYS.

UNITED STATES PATENT OFFICE.

AUGUST BERGHAUS, OF BRÜGGE, PRUSSIA, GERMANY.

HANDLE ATTACHMENT FOR AGRICULTURAL AND LIKE IMPLEMENTS.

SPECIFICATION forming part of Letters Patent No. 235,408, dated December 14, 1880.

Application filed May 31, 1880. (No model.) Patented in Germany October 2, 1879.

*To all whom it may concern:*

Be it known that I, AUGUST BERGHAUS, of Brügge, Kingdom of Prussia, German Empire, have invented a new and Improved Handle Attachment for Agricultural and Like Implements, of which the following is a specification.

The object of my invention is to provide a new and improved attachment for the handles of agricultural and like implements, whereby the handles can be attached to the said implements in a simple and effective manner.

The invention consists in a spring-socket attached to the implement and arranged to receive the end of the handle, which is held therein by a conical ring or sleeve drawn over the ends of the spring-socket, holding the end of the handle between them.

In the accompanying drawings, Figure 1 is a side view of a rake provided with my improved attachment for handles. Fig. 2 is a plan view of the same. Fig. 3 is a side view of a spade provided with my improved attachment for handles. Fig. 4 is a plan view of the same. Fig. 5 is a longitudinal sectional view of the same. Fig. 6 is a longitudinal sectional elevation of the conical ring for holding the handle in the spring-socket.

Similar letters of reference indicate corresponding parts.

A spring-socket, A, is formed of the two springs B B', which are riveted or otherwise attached to the rake C, spade D, or any other implement. The springs are curved and their concave sides are arranged opposite each other, as shown. The tapered end E of the handle F is placed between the springs B B', and the conical ring or sleeve G is drawn or forced down in the direction toward the other end of the handle in some suitable manner, thereby pressing the springs B B' firmly against the tapered end of the handle and holding the implement to the handle in a very effective manner. The handle can thus be attached to or detached from the implement in a very short time and in a convenient manner, and one handle may be used successively for several implements.

I am aware that it is not new to pivot a handle between two straps on the blade and secure it by a set-screw and sliding clamp, or to use a contracting or expanding eye, or to slot the end of the holder and to provide screw-threaded plates to receive a screw-thimble; but What I do claim as new and of my invention is—

1. An attachment for the handles of agricultural and other implements made substantially as herein shown and described, and consisting of a spring-socket attached to the implement, and of a conical ring or sleeve, which presses the socket to the end of the handle, as set forth.

2. The combination, with the handle F, of the springs B B', and conical ring or sleeve G, substantially as herein shown and described, and for the purpose set forth.

The above specification of my invention signed by me this 2d day of April, 1880.

AUGUST BERGHAUS.

Witnesses:
 FRIEDRICH MALLENKOTT,
 EMILE HEYER.